United States Patent Office.

EBEN S. BURNS, OF PORTLAND, MAINE.

Letters Patent No. 93,804, dated August 17, 1869.

IMPROVED PAINT.

The Schedule referred to in these Letters Patent and making part of the same.

*To all whom it may concern:*

Be it known that I, EBEN S. BURNS, of Portland, in the county of Cumberland, and State of Maine, have invented a new and useful Improved Paint; and I hereby declare the following to be a full, clear, and exact description of the same, and of the method of preparing and compounding the same, so as to enable others to manufacture and prepare the invention.

The purpose of my invention is to produce a paint, which does not require a coating or preparation on the article to be painted, before the paint is applied.

It is well known, that in many kinds of fine or finished work, and other work, that the wood must first be prepared by rubbing and polishing, and then a coat of priming laid on, which is afterward rubbed with sand-paper, or some other scouring and smoothing-preparation. I design to produce an article which will obviate this necessity.

My invention consists in a composition or mixture of turpentine, white lead, linseed-oil, japan, beeswax, tar, and rosin.

I compound my paint in the following proportions:

Two parts of turpentine; two, of white lead; one, of boiled linseed-oil; one, of japan; one, of beeswax; one, of tar; one, of rosin.

These, when thus combined, may be cooked or heated, if desired, to make the union more complete.

I particularly design my improved paint to take the place of, or to do away with the coating, so called, used on carriages and carriage-work.

It is as profitably applied, however, to metals as to wood, and is equally as adhesive there, and will wear as well.

What I claim as my invention, and desire to secure by Letters Patent, is—

The described composition of ingredients, when compounded in the manner, proportions, and for the purposes hereinbefore set forth.

EBEN S. BURNS.

Witnesses:
WILLIAM HENRY CLIFFORD,
HENRY C. HOUSTON.